United States Patent [19]

Thomas

[11] 4,403,900
[45] Sep. 13, 1983

[54] PALLET STORING AND DISTRIBUTING APPARATUS

[75] Inventor: Paul M. Thomas, Paradise Valley, Ariz.

[73] Assignee: Builders Equipment Company, Phoenix, Ariz.

[21] Appl. No.: 225,713

[22] Filed: Jan. 16, 1981

[51] Int. Cl.³ .............................................. B65G 60/00
[52] U.S. Cl. .................................... 414/137; 271/3.1; 271/130; 271/155; 414/80; 414/102; 414/119
[58] Field of Search .................... 414/37, 80, 100, 101, 414/102, 117, 118, 119; 271/3.1, 128, 130, 144, 154, 155

[56] References Cited

U.S. PATENT DOCUMENTS

| | | | |
|---|---|---|---|
| 3,182,818 | 5/1965 | Crile et al. | 414/102 X |
| 3,416,674 | 12/1968 | Gualandris et al. | 414/80 X |
| 3,533,517 | 10/1970 | Heide | 414/100 X |
| 3,602,377 | 8/1971 | Sims | 414/118 |
| 3,643,823 | 2/1972 | Argyres et al. | 414/119 X |
| 3,831,780 | 8/1974 | Skarin et al. | 414/37 X |
| 3,933,254 | 1/1976 | Pulver et al. | 414/37 |
| 4,311,425 | 1/1982 | Pulda | 414/84 |

OTHER PUBLICATIONS

IBM Technical Disclosure Bulletin, vol. 20, No. 5, Oct. 1977; Paper-Stack Height Control.

Primary Examiner—Leslie J. Paperner
Attorney, Agent, or Firm—Luedeka & Neely

[57] ABSTRACT

An apparatus for storing a plurality of pallets and for distributing pallets one at a time to a work station includes a vertically oriented magazine with an open top end for storing a plurality of pallets one above the other and a pallet unloading device horizontally movable to and from the open top end of the pallet magazine. The pallet unloading device removes pallets one at a time from the open top end of the magazines and delivers them to a work station. The magazine has a pallet lifting device to lift pallets in the magazine to the open top end of the magazine and in position to be removed therefrom by the pallet unloading device. A pallet loading device is located over the top open end of the magazine to selectively load the magazine with pallets as the number of pallets stored in the magazine diminishes.

10 Claims, 3 Drawing Figures

PALLET STORING AND DISTRIBUTING APPARATUS

The present invention relates to material handling apparatus, and more particularly to an apparatus including a storage device for vertically storing items and a horizontally movable unloading device for removing items one at a time from the storage device and transporting the items to a work station.

Various manufacturing processes require the use of pallets during some stage in the process. These pallets must be readily available in adequate numbers and transportable to a work station so that the manufacturing process is not interrupted for lack of pallets.

In the manufacture of large heavy articles such as concrete blocks, for example, the pallets used must be accordingly quite large and, therefore, heavy. Typically, the pallets are stacked vertically one above the other and removed from the bottom end of the stack for transportation to a work station. Because the pallets are heavy it is very difficult to remove pallets from the bottom of the stack due to the weight of the stack of pallets weighing down on the bottom pallet to be removed. Therefore, the number of pallets which can be stacked is limited to decrease the weight on the lower most pallet so that the lower most pallet can be readily removed for transport to a working station. Typically, the number of pallets which can be stacked is limited to about five in number. This, of course, means that the stack of pallets is rapidly diminished and must be virtually continuously replenished. This can slow down the pallet unloading step and, therefore, the feeding of pallets to the work station and consequently slow down the manufacturing process. Also, because of the limited number of stacked pallets, and the rate at which they are used, from time-to-time the supply of stacked pallets becomes exhausted before additional pallets can be added to the stack, thus causing an interruption in the manufacturing process.

Because of the weight of the stacked pallets, the devices used to remove pallets from the bottom of the stack must be commensurately strong and of heavy construction. This adds to the cost of constructing and maintaining a pallet removal device.

In addition, the drive means for driving the pallet removal device for removing pallets from the bottom of a stack of pallets must be powerful. The more powerful the drive means the more energy is required and, therefore, the more expensive it is to operate.

The present invention recognizes these deficiencies and problems and provides a solution which is rapid, and relatively inexpensive to operate and maintain in service.

An object of the present invention is to provide an apparatus for removing a pallet from the top of a stack of pallets.

Another object of the present invention is to provide an apparatus for selectively and rapidly replenishing the supply of pallets as the pallets are used.

A further object of the invention is to provide an apparatus which is relatively inexpensive to operate and maintain.

Other objects and advantages of the present invention will become known by reference to the specification and accompanying drawings wherein like numerals refer to like parts throughout and in which.

Figure 1:
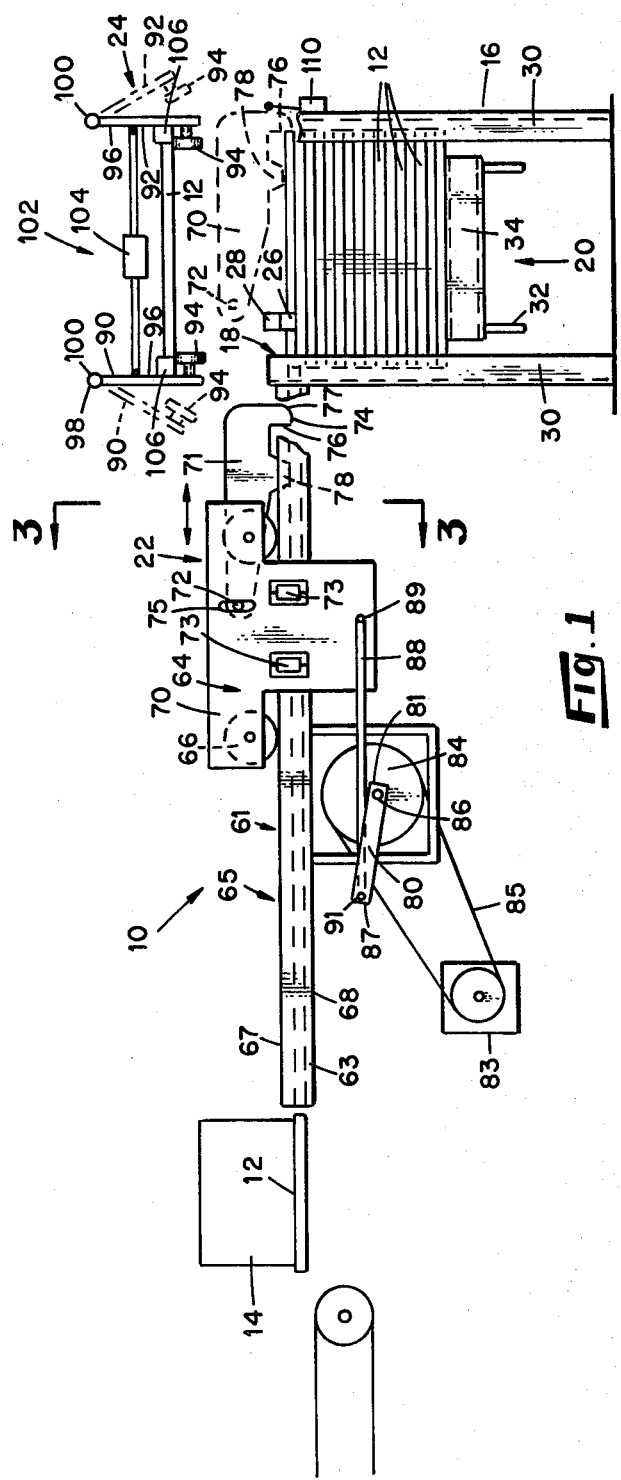
FIG. 1 is a diagrammatic side view of an apparatus for storing a plurality of pallets in a stack and for removing pallets one at a time from the top of the stack embodying various features of the present invention.

The present invention, in a preferred form, provides an apparatus, generally denoted as the numeral 10, for vertically storing a plurality of items, such as pallets 12, in a stack and for distributing pallets 12 one at a time from the top end of the stack to a work station 14 remote from the stack of pallets.

With reference to the figures, the apparatus 10 comprises a vertically oriented magazine 16 having an open top end 18 for holding a plurality of pallets 12 one above the other. Pallet lift means 20 is disposed in the magazine 16 for movement in the vertical direction. As the pallet lift means moves the pallets are lifted or lowered in the magazine to properly locate the top most pallet 12 of the stack at the open top end 18 of the magazine 16. Pallet unloading means, generally denoted as the numeral 22, is disposed adjacent the open top end 18 of the magazine 16 and mounted for reciprocal horizontal movement between the magazine 16 and the work station 14. Pallet loading means, generally denoted as the numeral 24, is located generally above the open top end 18 of the magazine 16 for selectively loading replacement pallets one at a time into the magazine 16 through the open top end 18 from time-to-time as the supply of pallets in the magazine is used. Means for sensing the position of the uppermost pallet, such as low level and high level limit means 26 and 28 are located at the top open end 18 of the magazine 16 to keep the top most pallet 12 of the stack at a proper position for pick-up by the pallet unloading means 22.

The pallet magazine 16 is illustrated as comprising four vertically oriented lengths of angle iron members 30 arranged to form the four corners of the magazine 16. Each corner of a pallet rides in the angle formed by a different one of the angle iron members 30 so that the pallets 12 are caged against lateral movement in the magazine 16. The four angle iron members 30 can be supported by virtually any arrangement of structural members.

The pallet lift means 20 is essentially a platform formed of two pairs of elongated tubular structural members 32 and 34. The tubular members 32 of one pair are oriented at a right angle to and intersect the tubular members 34 of the other pair. The intersecting pairs of tubular members 32 and 34 are connected together at their points of intersection. The pallet lift platform 20 is disposed in the vertical pallet magazine 16 for movement in the direction of the longitudinal axis of the magazine, i.e., in the vertical direction. The stack of pallets 12 rest on the pallet lift platform 20 and, therefore, move with the pallet lift platform 20.

Figure 2:
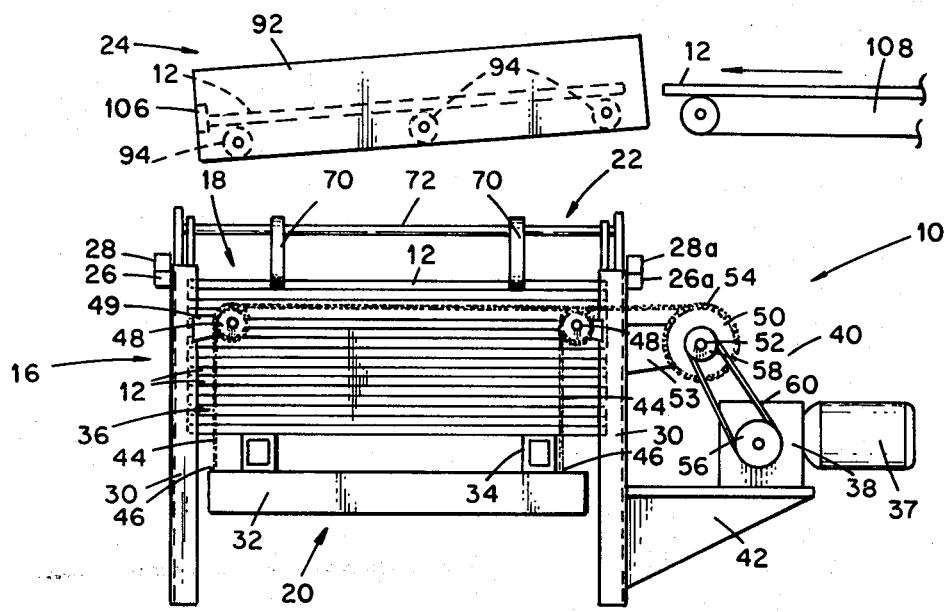
FIG. 2 is an end view taken in the direction of arrows 2—2 in FIG. 1.

As illustrated in FIG. 2, the pallet lift platform 20 is caused to selectively move vertically in the pallet magazine by means of a chain and sprocket arrangement 36 driven by a reversible electric motor 37 and gear box 38 through a belt or chain drive system 40. The electric motor 37 and gear box 38 are mounted to a fixed shelf 42 attached to and cantilevered outwardly from the magazine 16. The chain and sprocket arrangement 36 for the lift platform 20 comprises four lengths of chain 44, only two being visible in the FIG. 2, each attached at one of its ends 46 to a different corner of the pallet lift platform 20. Four idler chain sprockets 43 are arranged in two pairs, only one pair being visible in FIG. 2. The pairs of chain sprockets 48 are located on opposite sides of the magazine. Each chain sprocket is generally tangentially vertically aligned with the end 46 of a different one of the chains 44 attached to the lift platform 20 and is rotatably mounted to the magazine 16 by means of brackets 49 attached to the angle iron member 30. Two spaced apart double take-up chain sprockets 50, only one being visible in FIG. 2, are mounted to a common axle shaft 52, and are located outside the magazine 16 generally over the cantilevered shelf 42. The axle shaft 52 is freely rotatably mounted on the shelf 42 by means of, for example, a bearing block 53. The take-up sprockets 50 are each generally aligned with a different pair of idler sprockets 48 on opposite sides of the magazine. The four lengths of chain 44 each extend generally vertically upwardly from its fixed end 46 which is attached to the lift platform 20 and is trained about a portion of the idler sprocket 48 which is in alignment with its fixed end 46. Each length of chain 44 extends horizontally from the idler sprocket 48 about which it is trained to the take-up sprocket 50 aligned with that idler sprocket and is attached at its other end 54 to the periphery of the take-up sprocket 50. The take-up chain sprocket 50 is peripherally sized so that the lift platform 20 will move between the limits of its vertical travel when the take-up sprockets 50 have moved through about 320 degrees of rotation.

The belt or chain drive system 40 comprises a driving pulley 56 attached to the output shaft of the motor gear box combination 38 for rotation therewith and a driven pulley 58 attached to the axle 52 of the take-up chain sprockets 50. An endless drive belt 60 is trained about both the driving pulley 56 and driven pulley 58 to transmit rotational motion from the motor gear 37 through the box 38 to the take-up sprockets 50. As the motor rotates in one direction, for example clockwise as viewed in FIG. 2, the chains 44 are pulled and wrap around the take-up sprockets 50, thus raising the lift platform 20 in the magazine. Similarly, as the motor rotates in the opposite direction, for example counter-clockwise, as viewed in FIG. 2, the chains 44 unwrap from around the take-up sprockets 50, thus lowering the lift platform 20 in the magazine 16.

Figure 3:
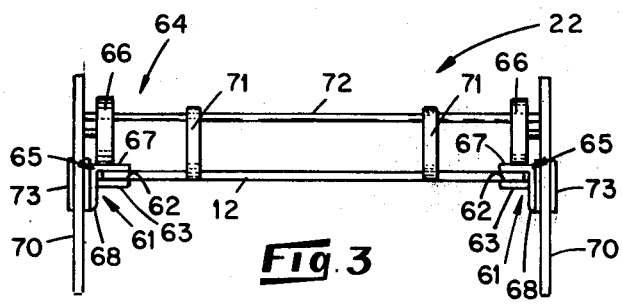
FIG. 3 is an enlarged cross-sectional view taken along line 3—3 in FIG. 1.

With reference to FIGS. 1 and 3, the pallet unloading means 22 comprises a pair of parallel spaced apart pallet slide rails 61 extending generally in the plane of the pallets on the magazine horizontally from a location adjacent the open top end 18 of the magazine 16 to the work station 14. The pallet slide rails 62 each have a generally C-shaped transverse cross-section with the openings of the C-shaped cross-sections facing each other. The opposite longitudinal edges of a pallet 12 are slidably received in the slot 62 formed by the C-shaped cross-section of the opposite slide rails 61. Each of the pallet slide rails 62 are illustrated as being formed of a horizontally oriented flat bearing plate 63 upon which the pallets 12 slide and a horizontally disposed length of angle iron 65 having one of its legs 67 parallel to and spaced above the bearing plate 63 and the other of its legs 68 extending downwardly from the leg 67 in parallel relationship and connected to the outside longitudinal edge of the bearing plate 62. The horizontal leg 67 of the length of angle iron 65 is spaced above the bearing plate 63 a distance somewhat greater than the thickness of a pallet 12.

A slot 69 is formed in each of the two vertical of angle iron members 30 forming the two corners of the pallet magazine 16 adjacent the pallet slide rails 61. The slots 69 are formed near the top end of each of the two angle iron members 30 and in-line with a different one of the C-shaped slots 62 defined in the pallet slide rails 61 so that a pallet 12 being moved from the magazine 16 to the slide rails 61 will be caged against lateral movement during the transition.

The pallet unloading means further comprises reciprocating means for sliding the top pallet from the magazine onto the pallet slide rails such as, for example, a trolley 64 having rotatably mounted wheels 66 which ride on the horizontal leg 67 of the lengths of angle iron 65 of the slide rails 62 for movement between a first position adjacent the open top end 18 of the magazine 16 and a second position toward the work station 14. The trolley 64 has at least one, but preferably two pallet pick-up arms 71 extending outwardly of the trolley generally toward the open top end 18 of the magazine 16. Each of the pallet pick-up arms 71 are pivotally attached near one end to the trolley 64 by means of, for example, an axle 72 and includes a downwardly projecting hook 74 formed in its free end. The hook 74 defines a shoulder 76 which has a depth approximately the same as the thickness of a pallet 12. The free end of each of the pick-up arms 71 has a cam or rounded surface 77 so that the arm 71 will ride-up smoothly over a pallet 12 in the magazine 16 in preparation for grabbing the pallet 12. As illustrated, the trolley 64 is formed of two parallel side frame members 70 spaced apart by a distance somewhat greater than the distance between the pallet slide rails 61 to provide clearance between the trolley 64 and slide rails 61. The wheels 66 are mounted for free rotation to the side frame members 70. Lateral caging wheels 73 are attached to each of the side frame members 70 with their axis of rotation vertically oriented. The lateral caging wheels 73 ride against the other or downwardly extending leg 68 of the horizontal lengths of angle iron 65 to guide and prevent the trolley 64 from moving laterally and off the pallet slide rails 61 as it moves between the first and second positions. The axle 72 of the pick-up arms 71 is disposed across the trolley 64 and extends between the trolley ride frame members 70. The opposite ends of the axle 71 are received in vertically oriented elongated slots 75 formed in each of the side frame members 70 with enough clearance for pivotal movement about the longitudinal axis of the axle 72 and vertical movement perpendicular to the longitudinal axis of the axle 72. The pick-up arms 71 also include a downwardly protruding leveling heel 78 spaced longitudinally of the pick-up arm from the hook 74 by a distance somewhat less than the length of a pallet. The heel 78 is adapted to ride on the top surface of a pallet 12 and is dimensioned so that when the shoulder 76 engages a pallet 12 the pick-up arm 71 is essentially level, generally parallel with the pallet and longitudinally in-line with the movement of the trolley 64 as the trolley 64 moves away from the magazine 16 to unload a pallet 12 from the magazine 16. The elongated slots 74 receiving the opposite ends of the axle 72 allow the the pick-up arm 71 to move in the vertical direction so that the pick-up arm 71 will assume a level orientation with pallets of somewhat different thicknesses.

The trolley 64 of the pallet unloading means 22 is caused to move along the pallet slide rails 61 between the first and second positions by a trolley drive means comprised of, for example, a crank arm 80 which is operatively associated at one of its ends 81 with the output shaft of an electric motor 83 for rotation with the motor output shaft. This operative association is illustrated as comprising a driven pulley 84 driven by the electric motor 83 through an endless drive belt 85 with the one end 81 of the crank arm 80 fixedly attached to the axle shaft 86 of the driven pulley 84. The free end 87 of the crank arm 80 is interconnected to the trolley 64 by means of a connecting rod 88. The rod 88 is pivotally attached at one end 89 to a side frame member 70 of the trolley 64 and is pivotally attached at its opposite end 91 to the free end 87 of the crank arm 80. The pivotal connections 89 and 90 of the rod 88 to the trolley 64 and crank arm 80 allows the rotational movement of the crank arm 80 to be translated to linear movement of the trolley 64. As the crank arm 80 is caused to rotate through 180 degrees of rotation, for example, in a clockwise direction as viewed in FIG. 1 by the motor 83 the trolley 64 is pulled from the first position adjacent the magazine 16 to the second position toward the work station 14. As the motor 83 continues to rotate through the next 180° of rotation the trolley 64 is pulled from the second position to the first position. An attribute of the crank arm 80 and connecting rod 88 configuration is that the trolley 64, and, therefore pallet 12, is slowly and uniformly accelerated from the first position at the magazine 16 to a point half way between the first and second positions and then slowly and uniformly decelerated from the half way point to a stop at the second location.

As the trolley 64 moves to the first position adjacent the open end 18 of the magazine, the hooked end 74 and leveling heel 78 of each of the pick-up arms 71 ride up the front end and across the top of a pallet 12 in position at the open top end 18 of the magazine 16 and the hook 74 engages the trailing end of the pallet 12 by capturing the trailing end in the shoulder 76 as shown in broken lines in FIG. 1. As the trolley 64 moves toward the second position away from the open end 18 of the magazine 16 it pulls the pallet 12 from the open end 18 of the magazine 16 through the slots 69 and in the angle iron members 30 into sliding engagement in the C-shaped pallet slide rails 61. When the trolley 64 reaches the second position, its direction of movement is again changed by the reciprocating crank arm 80 and the trolley 64 moves back toward the first position. When the trolley 64 changes direction back toward the first position, the shoulders 76 of the hooks 74 in the free end of the pick-up arms 71 disengage from the trailing end of the pallet 12 thus depositing the pallet 12 at the second position. The trolley 64 moves back to the first position where it picks up another pallet 12 located at the top open end 18 of the magazine 16 and the above-described procedure is repeated. When the pallet 12 being moved from the magazine by the trolley 64 reaches the second position occupied by the previously deposited pallet 12, the pallet 12 being moved by the trolley 64 pushes the previously deposited pallet 12 along the pallet slide rails 61 toward the work station 14 so that as the unloading process continues, pallets 12 are continuously indexed to the work station.

The uniform acceleration and deceleration of the trolley 64 prevents shock loads from being generated between the pallets 12 of the slide rails 61 as they are pushed by the pallet being unloaded from the magazine. In some process operations, shock loads on the pallets will damage the article on a pallet at the work station.

Each time the top most pallet in the magazine 16 is removed from the open top end 18 of the magazine 16, the stack of pallets in the magazine is indexed upwardly by the pallet lift means 20 so that there is always a pallet properly located at the open top end 18 of the magazine 16 for pick-up by the pallet pick-up arm 71. The position of a pallet 12 at the open top end 18 of the magazine 16 is controlled by the pallet sensing means, for example, low and high limit means, such as, for example, photocells 26 and 28, located approximately at the open top end 18 of the magazine 16. Both the low level photocell 26 and high level photocell 28 are operatively associated with the electric motor 37 of the pallet lift platform 20. The low level photocell 26 is operatively associated with, for example, the side of the windings of the electric motor 37 which cause the electric motor 37 to rotate clockwise, thus, causing the lift platform 20 to move upwardly in the magazine toward the open top end 18 of the magazine 16. Likewise, the high level photocell 28 is operatively associated with that side of the windings which cause the electric motor 37 to rotate counter-clockwise thus causing the lift platform 20 to move downwardly in the magazine away from the open top end 18 of the magazine. The low level photocell 26 has a light source 26a in-line with and across the open top of the magazine from it and the high level photocell 28 has a light source 28a in-line with and across the open top of the magazine from it. In operation, when a pallet 12 is in the proper position at the open top end 18 of the magazine, a light beam to the low level photocell 26 from the light source 26a is interrupted and the low level photocell 26 is de-energized which de-energizes the electric motor 37. Concurrently, a light beam to the high level photocell 28 from the light source 28a is not interrupted there being no pallet at the high level position in the magazine and the high level photocell 28 is also de-energized. When the pallet unloading means 22 removes a pallet 12 from the open top end 18 of the magazine the obstruction to light beam path to the low level photocell 26 is removed and the low level photocell 26 is energized thus energizing the electric motor 37 in a direction to move the lift platform 20 upwardly in the magazine 16 to position the next succeeding pallet at the open top end 18 of the magazine 16. When the next pallet 12 is at the proper position at the open top end 18 of the magazine 16 it obstructs the light beam to the low level photocell 26 de-energizing the low level photocell 26 and de-energizing the electric motor 37 stopping further movement of the lift platform 20.

As the supply of pallets 12 diminishes, the magazine 16 is resupplied by means of the pallet loading means 24 located generally over the open top end 18 of the magazine 16. The pallet loading means 24 is illustrated as comprising two spaced apart parallel pivotally mounted elongated plates 90 and 92. The elongated plates 90 and 92 are spaced apart by a distance approximately equal to the width of a pallet 12 and equally spaced to either side of the centerline of the magazine 16. Further, the elongated plates 90 and 92 are oriented at an angle to the horizontal so that they have a downward slope. Each elongated plate 90 and 92 has a row of rollers 94 freely rotatably mounted to the facing surfaces 96 of the elongated plates 90 and 92. The elongated plates 90 and 92 each have a pivotal mounting 98 and 100, respectively, attaching the elongated plates to an appropriate super structure. The elongated plates 90 and 92 are selectively and simultaneously pivoted by way of pivot activating means, generally denoted as the numeral 102. The pivot activating means 102 is illustrated as comprising, for example, a double acting hydraulic or pneumatic cylinder device 104 located transversely of and across the space defined between the elongated plates 90 and 92, and interconnecting the elongated plates. As the cylinder device 104 is activated to move the piston rod outwardly, the elongated plates 90 and 92 are caused to pivot about their respective pivot mountings 98 and 100 away from each other and outwardly from the space between them as shown in broken lines in FIG. 1. As the piston rod moves inwardly of the cylinder device 104, the elongated plates 90 and 92 pivot about their respective pivot mountings 98 and 100 toward each other as shown in solid lines in FIG. 1.

At least one stop means, illustrated as a pair of flanges 106, are attached to the elongated plates 90 and 92 at the lower most end of the elongated plates 90 and 92. The stop flanges 106 project toward each other from the elongated plates 90 and 92 generally inwardly into the space defined between the two elongated plates 90 and 92.

A horizontally disposed belt conveyor 108 is located adjacent the elevated end of the elongated plates 90 and 92 and in-line with the space defined between the elongated plates 90 and 92. The belt conveyor 108 extends to, for example, a pallet storage area.

In operation, pallets 12 to be loaded into the magazine 16 are placed on the conveyor belt 108 at a pallet storage area, and moved thereon to the pallet loading means 24. The pallets move, one at a time, from the belt conveyor 108 onto the pallet loading means 24 between the elongated plates 90 and 92 and on the rollers 94. The pallets 12 move on the rollers 94 by gravity due to the downward slope of the elongated plates 90 and 92 until they come into abutment with the stop flanges 106 and are in position over the open top end 18 of the magazine 16. The hydraulic or pneumatic cylinder device 104 is activated causing the elongated plates 90 and 92 to pivot away from each other and outwardly of the space defined between the elongated plates 90 and 92 thus, dropping a pallet 12 downwardly out of the pallet loading means 24 and into the magazine 16 through the open top end 18.

If there are already pallets 12 in the magazine 16, the newly added pallet 12 received from the pallet loading means 24 may be located too high in the open top end 18 of the magazine to be removed by the pallet unloading means 22. If this occurs, the newly added pallet will interrupt the light beam to the high level photocell 28 thus energizing it which in turn energizes the electric motor 37 of the pallet lift means to rotate in a direction to move the lift platform 20 downwardly. When the newly added pallet moving downwardly with the lift platform 20 moves out of the light beam path to the high level photocell 28 the electric motor 37 is deenergized and the pallet 12 is in a proper position for unloading by the pallet unloading means 22.

To assure that a pallet 12 cannot be loaded into the magazine 16 from the pallet loading means 24 when the pick-up arms 71 of the pallet unloading means 22 are in position unloading a pallet from the open top end 18 of the magazine 16, a loading stop means, such as a switch 110 is provided. The loading stop switch 110 is operatively associated with the hydraulic or pneumatic control of the cylinder device 104 and is located, for example, at the open top end 18 of the magazine 16 in such a location that the pick-up arms 71 abut and open the loading stop switch 110 when the pick-up arms 71 are in the process of removing a pallet from the magazine. Thus, the control for the cylinder device 104 is deactivated so that the cylinder device 104 cannot be activated to pivot the elongated plates 90 and 92 of the pallet loading means 24 away from each other.

The foregoing detailed description is given primarily for clearness of understanding and no unnecessary limitations should be understood therefrom for modifications will be obvious to those skilled in the art upon reading this disclosure and may be made without departing from the spirit of the invention and scope of the appended claims.

What is claimed is:

1. An apparatus for storing a plurality of pallets and for distributing pallets one at a time to a work station, comprising:
   a vertically oriented magazine having an open top end for holding a plurality of pallets stacked one upon the other;
   pallet lift means disposed for movement in the vertical direction to selectively move pallets stored in the magazine in a travel path upwardly to the open top end of said magazine and downwardly away from the open top end of said magazine;
   pallet unloading means movable in a horizontal direction disposed adjacent the open top end of the magazine for removing pallets one at a time from the top open end of the magazine;
   said pallet unloading means including:
      opposed pallet support means extending generally parallel to the plane of the pallets in the magazine; and;
      reciprocating means for sliding the top pallet from the magazine onto said pallet support means;
   pallet loading means disposed above the open top end of the magazine for selectively loading pallets downwardly into the magazine through its open top end; and,
   means disposed outside of the travel path of the pallets for sensing the position of the uppermost pallet relative to said pallet unloading means, and means operatively connecting said sensing means to said pallet lift means to raise said pallet lift means when the uppermost pallet is positioned below a predetermined low level and to lower said pallet lift means when the uppermost pallet is positioned above a predetermined high level to thereby maintain the uppermost pallet in position to slide onto said opposed pallet support means.

2. The apparatus of claim 1, wherein:
   said pallet loading means comprises means for sensing the presence of said reciprocating means and for preventing loading of pallets into said magazine when said reciprocating means is in the process of removing a pallet from said magazine.

3. The apparatus of claim 1, wherein said pallet loading means comprises:
   two parallel elongated plates spaced apart a distance approximately equal to the width of pallet and equally spaced to either side of the centerline of said magazine;
   said elongated plates being adapted to receive a pallet to be loaded between them and locate the pallet directly over the open top end of said magazine; and,
   said elongated plates being pivotally mounted for simultaneous pivotal movement away from each other outwardly of the space defined between them and back toward each other whereby when said elongated plates pivotally move away from each other a pallet received between them is dropped into said magazine through the open top end.

4. The apparatus of claim 3, wherein said pair of elongated plates are disposed at a downward slope from the horizontal so that pallets to be loaded into the magazine move under the influence of gravity into the space defined between said elongated plates.

5. The apparatus of claim 1 wherein said means for sensing comprises:
a low sensor means for sensing when the uppermost pallet is positioned below the predetermined low level;
a high sensor means for sensing when the uppermost pallet is positioned above the predetermined high level; and
said pallet lift means being responsive to said low sensor means to raise said pallet lift means and being responsive to said high sensor means to lower said lift means.

6. The apparatus of claim 5 wherein said low sensor means is positioned on the level of said pallet unloading means and said high sensor means is positioned adjacent to and above said low sensor means.

7. An apparatus for storing a plurality of pallets and for distributing pallets one at a time to a work station, comprising:
a vertically oriented magazine having an open top end for holding a plurality of pallets stacked one upon the other;
pallet lift means disposed in the magazine for movement in the vertical direction to selectively move pallets stored in the magazine upwardly to the open top end of said magazine and downwardly away from the open top end of said magazine;
pallet unloading means movable in a horizontal direction disposed adjacent the open top end of the magazine for removing pallets one at a time from the top open end of the magazine and transporting the pallets to a work station remote from the magazine;
said pallet unloading means including
pallet slide rails which extend generally parallel to the plane of the pallets in the magazine;
trolley means movable on said pallet slide rails toward and away from the open top end of said magazine;
pallet pick-up means mounted to said trolley means for removing pallets one at a time from the open top end of said magazine and onto said pallet slide rails as said trolley means moves away from said magazine; and, means for reciprocally moving said trolley means toward and away from the open top end of said magazine;
pallet loading means disposed above the open top end of the magazine for selectively loading pallets downwardly into the magazine through its open top end; and means for sensing the position of the uppermost pallet relative to said pallet unloading means, and means operatively connecting said sensing means to said pallet lift means to raise or lower said pallet lift means to thereby maintain the uppermost pallet in position to slide on said slide rails while being removed by said pallet unloading means.

8. The apparatus of claim 7, wherein said pallet pick-up means comprises at least one pallet pick-up arm pivotally attached at one of its ends to said trolley means and having a free end projecting from said trolley means formed with shoulder means for engaging an edge of a pallet at the open top end of said magazine.

9. The apparatus of claim 7, wherein said means for reciprocally moving said trolley means comprises:
a crank arm rotatably attached at one end to said trolley means; and,
motor means for rotatably moving said crank arm.

10. An apparatus for storing a plurality of pallets and for distributing pallets one at a time to a work station, comprising:
a vertically oriented magazine having an open top end for holding a plurality of pallets stacked one upon the other;
pallet lift means disposed in the magazine for movement in the vertical direction to selectively move pallets stored in the magazine upwardly to the open top end of said magazine and downwardly away from the open top end of said magazine;
pallet unloading means movable in a horizontal direction disposed adjacent the open top end of the magazine for removing pallets one at a time from the top open end of the magazine and transporting the pallets to a work station remote from the magazine;
said pallet unloading means including:
two pallet slide rails extending generally parallel to the plane of the pallets in the magazine and being spaced apart at a distance approximately equal to the width of a pallet, said rails each having a generally C-shaped transverse cross section and oriented with the openings into the C-shaped cross section facing toward each other, such that a pallet unloaded from said magazine is slidably received in the C-shaped cross section of said rails for movement therealong; and reciprocating means for sliding the top pallet from the magazine onto said pallet slide rails;
pallet loading means disposed above the open top end of the magazine for selectively loading pallets downwardly into the magazine through its open top end; and, means for sensing the position of the uppermost pallet relative to said pallet unloading means, and means operatively connecting said sensing means to said pallet lift means to raise or lower said pallet lift means to thereby maintain the uppermost pallet in position to slide onto said slide rails while being removed by said pallet unloading means.

* * * * *